United States Patent Office 2,773,867
Patented Dec. 11, 1956

2,773,867

PROCESS FOR DEHALOGENATING STEROIDS

Percy L. Julian, Oak Park, and Jerome G. Klein, Niles, Ill., assignors to The Glidden Company, Cleveland, Ohio, a corporation of Ohio No Drawing. Application May 17, 1954,
Serial No. 430,441

14 Claims. (Cl. 260—239.47)

This invention relates to the dehalogenation of steroids. More particularly, it relates to the preparation of 17α-hydroxypregnenes and allopregnanes, and especially this invention relates to an improved process for the preparation of 17α,21-dihydroxy-20-keto-pregnenes.

In the preparation of steroids having the ketol side-chain at carbon atom 17, the methods involving the use of 16,17-compounds have been shown to possess desirable features. Not only are the 16,17-epoxy compounds readily obtainable by methods which are practical to operate on a commercial scale, but also such derivatives have been converted by known means to 17α-hydroxy compounds corresponding to the naturally-occurring hormones of the adrenal cortex and intermediates useful in the preparation thereof. Thus, as disclosed in Patent 2,648,663, the 20-cyclic ketals of the 16,17-epoxy-pregnenes and -pregnanes, upon treatment with a bimetallic hydride, e. g., lithium aluminum hydride, are converted to the corresponding 17α-hydroxy compound, which, by acid hydrolysis of the 20-ketal, gives the 17α-hydroxy-20-keto-pregnenes and -pregnanes. Similarly, as disclosed in Patent No. 2,662,904, 16,17-epoxy-20-keto-pregnenes and pregnanes, upon reduction with a bimetallic hydride, give rise to the corresponding 17α,20-dihydroxy-pregnene and -pregnane C$_{20}$-epimeric mixtures. A second type of reaction leading to 17α-hydroxy-steroids is disclosed in copending application Serial No. 143,146, filed February 8, 1950, which involves formation of the vicinal bromohydrin from the 16,17-oxido-pregnenes and -pregnanes and treatment of the bromohydrin with Raney nickel to replace the bromine with hydrogen. These methods represent distinct advances in the art of preparing 17α-hydroxy compounds, and the vicinal bromohydrin procedure, at least, has been applied to the large scale manufacture of hydroxylated steroidal hormones of the adrenal cortex and intermediate products therefor. Notwithstanding the fact that the Raney nickel procedure obviated the use of dangerous and/or relatively expensive materials, this procedure itself is subject to certain disadvantages, especially in view of later developments. For example, LiAlH$_4$ is generally used in conjunction with anhydrous ether, a relatively hazardous and expensive material when used in large scale operations. Further, to prepare 17α-hydroxy-20-keto steroids, the 20-oxo group must be protected during reduction with bimetallic hydrides or the epimeric 20-hydroxy compounds must be oxidized back to the 20-keto steroids. Accordingly, use of this reagent, which itself is relatively expensive, involves additional processing steps. The method involving the use of Raney nickel is subject to the hazards of handling the pyrophoric substance on a large scale, and is still subject to improvement in yield.

It is therefore an object of this invention to provide an improved method for the preparation of 17α-hydroxy-20-keto-pregnenes and allopregnanes.

A further object of the invention is to provide an improved process for the preparation of 17α-hydroxy-pregnenes and allopregnanes directly from the corresponding bromo-17α-hydroxybromohydrin.

Another object is to provide a novel method for dehalogenating certain halogenated steroids.

An additional object is to provide a process for the preparation of Reichstein's Substance "S" in improved yield.

A still further object is to provide an improved process for the preparation of allopregnanes possessing the ketol side-chain attached to ring D.

We have now found that the 16,17-bromohydrins of pregnenes which can be obtained from the corresponding epoxy derivatives, or the corresponding trans-dihalo-allopregnanes, are readily dehalogenated by treatment with hydrogen in the presence of certain finely divided metallic catalysts. Thus, upon treatment of a 16-bromo-17α-hydroxy-pregnene in a suitable solvent, e. g., methanol, with hydrogen in the presence of palladium hydroxide supported on calcium carbonate or Raney nickel and at about 10 p. s. i. initial pressure, we have obtained practically the theoretical yield of the 17α-hydroxy-pregnene or allopregnane derivative.

We have found that depending upon the conditions employed, it is possible to stop the reaction at the pregnene stage without substantial reduction of the double bond in ring B. Thus, by selecting a solvent for the reaction such that the bromohydrin is more soluble therein than the resulting debrominated Δ$^5$-pregnene, the product obtained is substantially free of the allopregnan-17α-ol derivative. Alternatively, we have made the surprising discovery that trans-5,6-dihalo-16-bromo-17α-hydroxypregnanes, upon treatment in accordance with our invention, give rise to the corresponding Δ$^5$-pregnen-17α-ol derivatives. Similarly, the trans-5,6-dihalo-16,17-epoxy-pregnanes yield the corresponding 16,17-epoxy-5-pregnenes. We believe that the results we have obtained follow logically from the consideration that in both instances the activity of the catalyst is affected, and, in a manner of speaking, "poisoned." In the instance of a solvent in which the bromohydrin is more soluble than the debrominated product, the latter upon formation partially crystallizes out on the surface of the catalyst, thereby removing it from the reaction. In the alternative instance, wherein trans-5,6-dihalobromohydrins are treated, the dehalogenation occurs with the formation of three moles of hydrohalogen acid. As is well known, such acids are effective hydrolysis catalysts and may cause some hydrolysis of ester groups, giving rise to free hydroxy compounds, which in most cases are less soluble than the original esters. Accordingly, we believe that in either instance, the dehalogenation reaction being more rapid than the reduction reaction is completed prior to the "poisoning" of the catalyst mass, and before substantial reduction occurs.

It is noted here that in all instances where the reaction has been permitted to proceed past the dehalogenation stage, reduction of the double bond has resulted in complete conversion to the allopregnane derivative.

The process of our invention is carried out in the following general manner: The bromohydrin is dissolved, at least partially, in an amount of suitable solvent, with slight warming if desired, and to the solution about 2 to 5 parts of catalyst are added. The mixture is placed in the hydrogenation apparatus and maintained under a pressure of hydrogen between about 2 and about 10 p. s. i., preferably at about 25° C., room temperature, until the absorption of hydrogen has ceased. Thereafter, the reaction mixture is filtered from the spent catalyst, and the product is obtained from the clarified solution in any suitable manner, e. g., by dilution with water, evaporation to dryness, etc. The product so obtained is generally a usable intermediate in further synthetic operations. If desired, the product can be purified by recrystallization with a minimum of yield loss.

The following examples will illustrate the process of our invention.

*Example 1.—Preparation of 5-pregnene-3β,17α-diol-20-one 3-acetate*

To a solution of 4 g. of 16-bromo-5-pregnene-3β,17α-diol-20-one 3-acetate in 200 cc. of absolute ethanol was added 12 g. of 2% palladium hydroxide on calcium carbonate, see Busch and Stove, Ber. 49, 1063 (1916). The mixture was reduced with hydrogen at a pressure which varied between 10 and 2.5 p. s. i. After about two hours, 99.3% of the theoretical amount of hydrogen required to replace the 16-bromo group had been adsorbed and the reaction was stopped. The mass was filtered and the filtrate was diluted with water. 1.0 g. of material, M. P. 210° to 215° C., was obtained. The filtered catalyst was extracted with methylene chloride and with methanol. Upon evaporation of the solvents, 2.3 g. of material, melting at 225° to 230° C., was obtained. The mixture of this material with the watered out product melted at substantially the same temperaure. The total crude product, 100% yield, was recrystallized from a mixture of benzene and petroleum ether, B. R. 60° to 90° C. The purified material melted at 232° to 235° C. and was recovered in a 91% yield.

Removal of the bromine from this bromohydrin with Raney nickel alone, according to the method described in J. A. C. S., 72, 5145 (1950), resulted in about an 80% yield of the identical product, 5-pregnene-3β,17α-diol-20-one 3-acetate.

*Example 2*

In a similar manner to that described in Example 1, when 2.5 g. of Raney nickel was used as a catalyst in place of the 2% palladium hydroxide, an 89% yield of the identical product was obtained.

*Example 3.—Preparation of allopregnan-3β,17α,21-triol-20-one 21-acetate*

(a) By gentle warming, 3.7 g. of 16-bromo-5-pregnene-3β,17α,21-triol-20-one 21-acetate was dissolved in 200 cc. of methanol. To this solution, 11.1 g. of 2% palladium hydroxide on calcium carbonate catalyst was added and the mixture reduced at 24.5° C. with hydrogen at a pressure which varied from 10 to 2.5 p. s. i. After about 2½ hours, the theoretical volume of hydrogen required to remove the 16-bromo group and saturate the double bond had been absorbed. The spent catalyst was filtered from the solution and the clarified filtrate was evaporated to a low volume. Thusly, 3.1 g., theory is 3.08 g., of crude product containing a trace of halogen and melting at 230° to 235° C. was obtained. This product is Reichstein's Substance P monoacetate.

(b) By altering the solvent used to a mixture of 180 cc. of methanol and 20 cc. of water, the product, 5-pregnene-3β,17α,21-triol-20-one 21-acetate, M. P. 210° to 212° C., was obtained.

*Example 4.—Dehalogenation of 5α,6β-dichloro-16α-bromo-allopregnane-3β,17α-diol-20-one 3-acetate*

A mixture of 2 g. of 5α,6β-dichloro-16α-bromo-allopregnane-3β,17α-diol-20-one 3-acetate, which is prepared by HBr treatment of 5α,6β-dichloro-16,17-epoxy-allopregnane-3β-ol-20-one acetate, prepared as disclosed in the application of Julian et al., Serial No. 430,442, filed May 17, 1954, 6.0 g. of 2% palladium hydroxide on calcium carbonate and 100 cc. of methanol was shaken with hydrogen at about 25° C. The pressure drop within the reaction vessel amounted to 6.75 p. s. i. The reaction mixture was heated to boiling and then filtered to remove spent catalyst. The filter cake was washed several times with hot methanol and finally with methylene chloride. The combined filtrate and wash liquors were concentrated to turbidity and then set aside in an ice box to crystallize. Upon filtration of the crystalline slurry and drying, 1.16 g. of shiny plates melting at 226° to 238° C., rotation (in chloroform, $\alpha_D = 64.5°$, were obtained. This product gives a negative Beilstein test for halogen and a mixture with an authentic sample of 17α-hydroxy-pregnenolone acetate melted at 228° to 231° C.

The mother liquor upon concentration gave 0.14 g. of additional material, M. P. 265° to 270° C., which was identified as the free 17α-hydroxy-pregnenolone, since upon acetylation it was converted to a product identical with that first crop material obtained above. The combined yield of dehalogenated product prepared in this manner is in excess of 90% of the theoretical amount obtainable. Similar results were obtained when the 5,6-dibromo bromohydrin was used instead of the trans-dichloro bromohydrin.

Repetition of this experiment using cis-5,6-dichloro-bromohydrin resulted in a pressure drop of only 3.3 p. s. i. The product was a mixture. The first crop, M. P. 232° to 235° C., contained 15.4% chlorine, theory for dichloro-17α-hydroxy-pregnenolone acetate = 15.9%, and depressed the melting point of the starting material and of cis-5,6-dichloro-17α-hydroxy-pregnenolone acetate.

When, instead of the trans-dichloro-bromohydrin, 2 g. of 5α,6β-dichloro-16,17 - epoxyallopregnan - 3β-ol-20-one acetate was used, 1.57 g. of 16,17-epoxy-5-pregnen-3β-ol-20-one acetate, 93.5% of theory, was obtained.

An analogous experiment using 2 g. of 5α,6β-dichloro-16,17-epoxy-allopregnane-3,20-dione gave 1.54 g., 90% of theory, of a product which gave no absorption in the ultraviolet. This product is 16,17-epoxy-allopregnane-3,20-dione.

In an analogous manner, 5α,6β-dichloro-16-bromo-allopregnane-3β,17α,21-triol-20-one 21-acetate gives 5-pregnene-3β,17α,21-triol-20-one 21-acetate, M. P. 210° to 212°, and 5α,6β-dichloro-16-bromo-allopregnane-17α,21-diol-3,20-dione 21-acetate gives 4-pregnene-17α,21-diol-3,20-dione 21-acetate, Substance "S"-acetate.

It can readily be seen from the foregoing illustrative examples that an improved process has been provided for the preparation of 17α-hydroxy-steroids from the corresponding 16,17-epoxy steroids. Our invention, moreover, is not limited to the specific compounds treated in the above examples, but is applicable to the preparation of 17α-hydroxy-20-oxosteroids from 16,17-epoxy-20-oxosteroids generally. Said steroids, as is well known in the art, can be converted to the corresponding 16-halogeno-17α-hydrdoxy-20-oxosteroids, which then can be dehalogenated in excellent yield by the process of the present invention. The compounds which can be used may be substituted elsewhere in the steroid nucleus, e. g., at the 2-, 3-, 6-, 7-, 11-, 12- and/or 21-positions, which substituents may be halogen, oxo-hydroxyl and/or a substituent which is readily convertible to hydroxyl as by hydrolysis. Halogen substituents, when present at other than the 5,6- and 16-positions, may be more or less completely removed during the reaction, and are, hence, preferably absent. The starting material can be saturated or unsaturated. Conjugated double bonds, because of their susceptibility to reductive influences, are preferably absent.

Furthermore, as illustrated in the above examples, either the free hydroxy compounds or their esters can be used. In addition to the acetate esters, the propionates, benzoates, naphthoates, nicotinates, hemisuccinates and various substituted derivatives thereof can be used.

Other solvents than those disclosed above can be used, also. Because of its ready availability, ease of removal and relative inexpensiveness, methanol is to be preferred. However, any mono- or dihydric alcohol in which the bromohydrin is soluble to an appreciable extent can be used. Dioxane and halogenated solvents (where these will not poison the catalyst), for example, methylene chloride or mixtures of said suitable solvents, can be used.

The reaction is preferably effected at about 25° C., as a matter of convenience. Higher temperatures, however, can be used to solubilize the bromohydrin if necessary. Further, the pressure of hydrogen under which the dehalogenation is carried out, can range from atmospheric to about 50 p. s. i. Preferably, a maximum of 10 p. s. i. should be used, at least at the commencement of the reaction.

We prefer to use a palladium hydroxide catalyst which is supported on calcium carbonate, although other alkaline earth carbonates, such as the strontium and barium carbonates, can be used. It is believed that the carbonate serves not only to support the palladium hydroxide (which during the hydrogenation is reduced to the active palladium moiety), but also to bind the hydrogen halide formed in the reaction. Other acid binding materials, e. g., barium oxide, can be used, but because of the well-known sensitivity of halohydrins, and particularly 16-bromo-17α-hydroxy-20-one steroids, to alkaline reagents, the catalyst supporting and acid binding material should preferably be a neutral reacting substance, e. g., an alkaline earth metal carbonate. Further, other noble metal catalysts, such as Raney nickel, can be used.

The 17α-hydroxy-20-oxo products of the process of our invention are useful intermediates in the synthesis of valuable steroid hormones which are characterized by the ketol structure attached to ring D of the nucleus.

Our invention has been described and illustrated by recourse to certain specific examples. Further, for the purpose of clarification we have suggested certain theoretical explanations for the improvements obtained thereby. It should be distinctly understood, however, that our invention is not limited to any of said examples, or by the ultimate correctness of said explanations, except insofar as said limitations are contained in the claims appended hereto.

Having described the invention, what is claimed is:

1. The process which comprises treating a solution of a steroid selected from the class consisting of 5α,6β-dichloro steroids of the allopregnane series, 5,6-dibromo steroids of the allopregnane series, 5,6-dibromo steroids of the pregnane series and 16-bromo-17α-hydroxy-Δ⁵ pregnenes with hydrogen in the presence of a catalyst selected from the class consisting of Raney nickel and palladium on an alkaline earth metal carbonate until the 5, 6 and 16 halogen substituents are removed.

2. The process of claim 1 in which the catalyst is palladium on an alkaline earth metal carbonate.

3. The process which comprises treating a solution of a 16-bromo-17α-hydroxy-Δ⁵-pregnene with hydrogen in the presence of a catalyst selected from the class consisting of Raney nickel and palladium on an alkaline earth metal carbonate.

4. The process which comprises treating a solution of a 10,13-dimethyl-16-bromo-17α-hydroxy-20-keto-Δ⁵-pregnene with hydrogen in the presence of a catalyst selected from the class consisting of Raney nickel and palladium on an alkaline earth metal carbonate.

5. The process of claim 4 in which the starting steroid is 16-bromo-5-pregnene-3β,17α,21-triol-20-one 3-acetate.

6. The process which comprises treating a solution of a 5α,6β-dichloro-20-keto-steroid of the allopregnane series with hydrogen in the presence of a catalyst selected from the class consisting of Raney nickel and palladium on an alkaline earth metal carbonate.

7. The process which comprises treating a solution of a 5α,6β-dichloro-16-bromo-17α-hydroxy-20-keto-steroid of the allopregnane series with hydrogen in the presence of a catalyst selected from the class consisting of Raney nickel and palladium on an alkaline earth metal carbonate.

8. The process of claim 7 in which the starting material is a 5α,6β-dichloro-16-bromo-17α-hydroxy-20-keto-21-acetoxy allopregnane.

9. The process of claim 8 in which the starting steroid is 5α,6β-dichloro-16-bromo-allopregnane-3β,17α,21-triol-20-one 21-acetate.

10. The process of claim 8 in which the starting material is 5α,6β-dichloro-16-bromo-allopregnane-17α,21-diol-3,21-dione 21-acetate.

11. The process which comprises treating a solution of a 5α,6β-dichloro-16,17-epoxy-20-keto-steroid of the allopregnane series with hydrogen in the presence of a catalyst selected from the class consisting of Raney nickel and palladium on an alkaline earth metal carbonate.

12. The process which comprises treating a 16-bromo-17α-hydroxy-20-keto-5-pregnene in solution with hydrogen in the presence of a catalyst selected from the class consisting of Raney nickel and palladium and stopping the treatment when the removal of the 16-bromo substituent is substantially complete.

13. The process which comprises treating a 5α,6β-dichloro-allopregnane in solution with hydrogen in the presence of a catalyst selected from the class consisting of Raney nickel and palladium on an alkaline earth metal carbonate and stopping the treatment when the removal of the 5,6-halogen groups is substantially complete.

14. The process which comprises treating a 5α,6β-dichloro-16-bromo-17α-hydroxy-20-keto-allopregnane in solution with hydrogen in the presence of a catalyst selected from the class consisting of Raney nickel and palladium on an alkaline earth metal catalyst and stopping the treatment when the removal of 5, 6 and 16-halo groups is substantially complete.

References Cited in the file of this patent

UNITED STATES PATENTS 2,343,311   Marker _____ Mar. 7, 1944

OTHER REFERENCES

Julian: JACS 72, pp. 5145–47, Nov. 1950.
Julian: Recent Advances in Hormone Research (1951), pp. 204–05.